P. D. SKAHEN.
ANTISKIDDING DEVICE.
APPLICATION FILED JAN. 12, 1918.
1,275,485.
Patented Aug. 13, 1918.
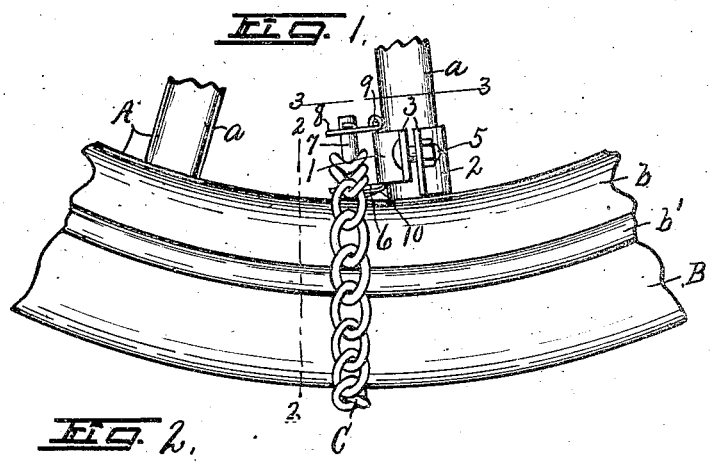
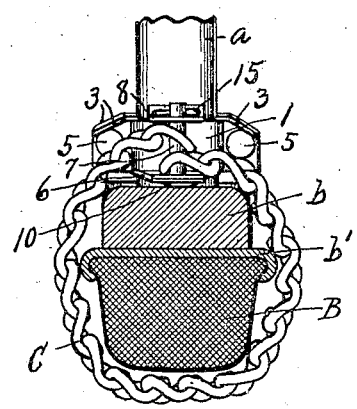
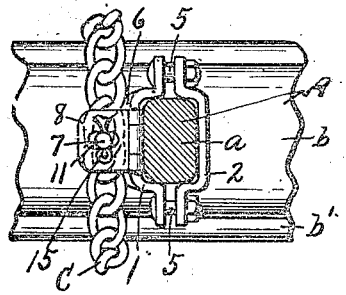
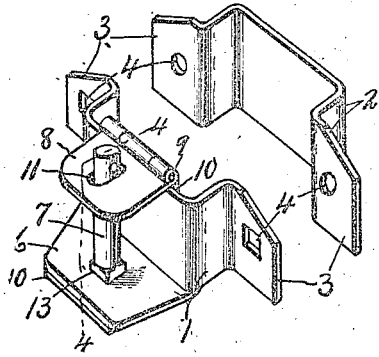
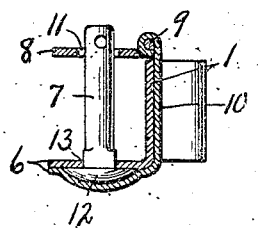
WITNESSES:
H. V. Hurst
INVENTOR
P. D. Skahen
BY
Howard P. Davidson
ATTORNEY.

UNITED STATES PATENT OFFICE.

PATRICK D. SKAHEN, OF SYRACUSE, NEW YORK, ASSIGNOR, BY MESNE ASSIGNMENTS, TO HENRY H. SIMPSON, OF BROOKLYN, NEW YORK.

ANTISKIDDING DEVICE.

1,275,485.      Specification of Letters Patent.      Patented Aug. 13, 1918.

Application filed January 12, 1918. Serial No. 211,544.

*To all whom it may concern:*

Be it known that I, PATRICK D. SKAHEN, a citizen of the United States of America, and resident of Syracuse, in the county of Onondaga, in the State of New York, have invented new and useful Improvements in Antiskidding Devices, of which the following, taken in connection with the accompanying drawings, is a full, clear, and exact description.

This invention relates to certain improvements in anti-skidding devices for vehicle wheels of the type set forth in my pending applications, Ser. No. 143,767, filed January 22, 1917, and Ser. No. 160,679, filed April 9, 1917, the specific object being to brace the free end of the attaching pin for the chains against lateral or radial strains, and at the same time to more effectively hold the ends of the chains against accidental displacement from the pins.

Another object is to reinforce the rim-engaging plate which carries the pin, and at the same time to provide simple means for retaining the pin in operative position upon the plate.

Other objects and uses will be brought out in the following description.

In the drawings—

Figure 1 is a side elevation of a portion of a truck wheel equipped with one of my improved anti-skidding devices.

Figs. 2 and 3 are sectional views taken, respectively, on lines 2—2 and 3—3, Fig. 1, showing the anti-skidding device in operative position.

Fig. 4 is a perspective view of the opposite clamping sections by which the anti-skidding device is clamped to one of the spokes, the clamping bolts being omitted.

Fig. 5 is a detail sectional view taken on line 5—5, Fig. 4.

As illustrated, this anti-skidding device comprises a pair of clamping members —1— and —2— having recesses in their adjacent sides to conform to the cross sectional contour of the spokes —*a*— of a vehicle wheel —A— having the usual felly —*b*—, rim —*b'*— and tire —B—.

The opposite ends of the clamping members —1— and —2— extend beyond the corresponding sides of the recesses to form lugs —3— which are apertured at —4— to receive suitable clamping bolts —5— by which the members —1— and —2— may be tightened upon and released from their individual spokes, the portion of the shank of each bolt adjacent the head and the corresponding aperture —4— for receiving the same being angular, as square, to hold the bolt against turning while the nut is being tightened and loosened.

These clamping members are preferably made from relatively heavy sheet metal, but may be made of castings or any other suitable material capable of withstanding the strains to which they are subjected, one of the clamping members, as —1—, being provided with a base plate —6— extending circumferentially of and adapted to rest upon the inner face of the felly when the device is adjusted for use so as to transmit the greater portion of the strains across a relatively broad area directly to the felly, while the portions of the clamping members which embrace the spokes serve to hold the anti-skidding device in operative position upon the wheel against circumferential or lateral movement.

Secured to the base plate —6— and projecting inwardly therefrom radial to the axis of the wheel is a stud or pin —7— constituting means of attachment for the ends of a cross chain —C— which extends around the felly, rim and tire across the tread of said tire and has its opposite end slipped over and upon the pin or stud —7—

The device as thus far described is quite similar to that set forth in my pending application, Ser. No. 143,767 referred to, but I have found that when used upon the wheels of heavy service trucks, the lateral strain upon the pin or stud —7— is sometimes sufficient to bend it laterally in one direction or the other to such an extent as to strip the cotter key and allow at least one end of the chain to slip off from the pin, and I have, therefore, improved the construction to overcome this difficulty by providing clamping member —1— with a brace plate —8— which is hinged at —9— to a reinforcing plate —10— and is movable into and out of locking engagement with the free end of the pin —7—, as shown more clearly in Figs. 4 and 5, and for this purpose is provided with a circumferentially elongated slot —11—, the width of which is substantially equal to the diameter of the pin —7— so as to engage the opposite sides of said pin and hold it against lateral bending movement.

The stud or pin —7— preferably consists of an ordinary bolt having a round head —12— and the adjacent portion of its shank square for entering a similarly formed opening —13— in the base plate —6—.

The reinforcing plate —10— is permanently secured by electric welding or otherwise to the inner face of the radial portion and circumferentially extending base plate of the clamping member —1— so as to cover and engage the head —12— of the bolt —7—, as shown in Fig. 5, for firmly holding the latter in operative position against removal from said base plate, and at the same time additionally bracing the bolt against lateral movement in the opening —13—.

The inner end of the bolt —7— extends beyond the brace plate —8— and is provided with an aperture —14— for receiving a cotter key —15— by which the brace plate is held in interlocking engagement with the adjacent end of the bolt.

This plate —8— in addition to its function of bracing the inner end of the bolt against lateral bending under the strains to which the opposite sides of the cross chain —C— are subjected also serves as a limiting stop or abutment for preventing displacement of the ends of the chains endwise from said bolt when the brace plate is held in operative position by the cotter key —15—.

In removing or replacing the cross chain of each individual anti-skidding device, as shown in Figs. 1 to 5, inclusive, it is simply necessary to withdraw the cotter key —15— and to swing the brace plate —8— about the axis of its hinge pin —9— to disengage it from the free end of the bolt —7—, whereupon the end links of the cross chain may be slipped over and upon or removed from said bolt, and when in operative position, the brace plate —8— may be returned to the position shown in Fig. 5 and the cotter key reinserted to hold it in place so that the bolt is practically held at both ends.

The clamps —3— are adapted to remain permanently upon the spokes ready to attach cross chains to their respective pins —7— whenever necessary, which may be done without jacking up the axle of the vehicle, and permits the use of as many cross chains as there are spokes, or a less number if desired, and if the cross chain becomes worn or otherwise impaired, it may be quickly removed and replaced without labor, expense or loss of time.

What I claim is:

1. In an anti-skidding device for vehicle wheels, the combination with the spokes, felly and tire, of a clamp secured to one of the spokes and provided with a circumferentially extending base plate resting against the inner face of the felly, a bolt on the base plate for attachment to a cross chain, and a cross chain attached to the bolt, said clamp having a hinged member for holding the cross chain on the bolt against inward displacement.

2. In an anti-skidding device for vehicle wheels, the combination with the spokes, felly and tire, of a base plate lying against the inner face of the felly, means for clamping the base plate to one of the spokes, a bolt secured to the base plate and extending radially and inwardly therefrom, a brace plate attached to the clamping means and movable into and out of engagement with the free end of the bolt, and a cross chain attached to said bolt.

3. In an anti-skidding device for vehicle wheels, the combination with the spokes, felly and tire, of a clamp attached to one of the spokes near the felly and provided with a radially extending pin and a brace plate hinged to the clamp to swing into and out of registration with the pin, and a cross chain having its ends attached to said pin.

4. In an anti-skidding device for vehicle wheels, the combination with the spokes, felly and tire, of a clamp attached to one of the spokes and provided with a pin and movable brace plate mounted on said clamp to move into and out of registration with the pin, and a cross chain having its ends attached to said pin.

In witness whereof I have hereunto set my hand this 5th day of January, 1918.

PATRICK D. SKAHEN.

Witnesses:
H. E. CHASE,
ALICE M. CANNON.